(12) United States Patent
Camiel

(10) Patent No.: US 8,307,215 B2
(45) Date of Patent: Nov. 6, 2012

(54) SYSTEM AND METHOD FOR AN AUTONOMOUS SOFTWARE PROTECTION DEVICE

(76) Inventor: Noam Camiel, Tel Aviv (IL)

( * ) Notice: Subject to any disclaimer, the term of this patent is extended or adjusted under 35 U.S.C. 154(b) by 1324 days.

(21) Appl. No.: 12/018,204

(22) Filed: Jan. 23, 2008

(65) Prior Publication Data

US 2009/0187769 A1 Jul. 23, 2009

(51) Int. Cl.
*G06F 12/14* (2006.01)
*G06F 9/00* (2006.01)
(52) U.S. Cl. ........................................ 713/189; 713/190
(58) Field of Classification Search .................. None
See application file for complete search history.

(56) References Cited

U.S. PATENT DOCUMENTS

| | | | | |
|---|---|---|---|---|
| 4,817,140 A | * | 3/1989 | Chandra et al. | 705/55 |
| 5,224,166 A | * | 6/1993 | Hartman, Jr. | 713/190 |
| 5,812,662 A | * | 9/1998 | Hsu et al. | 705/55 |
| 7,610,409 B2 | * | 10/2009 | Huang et al. | 710/6 |
| 8,087,017 B1 | * | 12/2011 | Whaley et al. | 718/1 |
| 2005/0044338 A1 | * | 2/2005 | Goss | 711/203 |

FOREIGN PATENT DOCUMENTS

WO  WO 2004003861 A1  1/2004

OTHER PUBLICATIONS

Lie et al., "Architectural Support for Copy and Tamper Resistant Software", ACM, 2000 ppl 168-177.*

* cited by examiner

*Primary Examiner* — William Powers

(57) ABSTRACT

A system and method is introduced for protecting software from being altered, duplicated, inspected or used in an unauthorized manner. An autonomous software protection device is presented, containing encryption and decryption unit along with an independent execution environment such as a Java Virtual Machine to carry out computations in a protected environment. The software protection device carries out protected code and may make use of protected data to carry out protected computations. Unsecured memory may be used securely by software protection device through an internal virtual memory mechanism managed by the independent execution environment. The software protection device may serve an external computing device for making computations that are protected from software and data alteration and inspection while preventing duplication and usage not as intended by the software and data owner.

17 Claims, 8 Drawing Sheets

SYSTEM AND METHOD FOR AN AUTONOMOUS SOFTWARE PROTECTION DEVICE

CROSS-REFERENCE TO RELATED APPLICATIONS

This application uses the frammis vane disclosed in patent application Ser. No. 11/518,923, filed Sep. 12, 2006 by the present inventor.

This application uses the frammis vane disclosed in patent application Ser. No. 11/750,331, filed May 17, 2007 by the present inventor.

This application claims the benefit of U.S. Provisional Patent Ser. No. 60/897,824, filed Jan. 29, 2007 by the present inventor.

FIELD OF INVENTION

This invention generally relates to the protection of data and software, and more particularly but not exclusively to distributing and protecting data and software from being altered, viewed, copied or compromised.

BACKGROUND OF THE INVENTION

Computer software protection is applied in many ways for a variety of reasons. Some of the reasons for using software protection are to protect investments of code development, such as to restrict reverse engineering and product copying. Another reason for using software protection is to prevent program alteration and breaking, for example in digital wallets. Another reason for using software protection is to prevent software duplication. Numerous other reasons for using software protection mechanisms exist.

Nevertheless, hacking programmers (referred herein as hackers) manage to bypass these protection schemes and break the program secure mechanism creating hacked versions of the program. Hacked versions are then made available, for example on the Internet for free download. In other cases a special chip known as a modchip is created by a manufacturer specifically to allow using duplicated software. A modchip is a small electronic device used to modify or disable built-in restrictions and limitations of many popular videogame consoles for example. See in Wikipedia http://en.wikipedia.org/wiki/Modchip.

In many cases, hackers are able to break program protection due to the fact that access is granted to entire memory, CPU and registers of their computer, console or device. With advanced tools, it is possible to view the protection mechanisms in action and learn how bypass them.

The damage from these hacks is not small, whether invested work is easily reverse engineered and copied, or since less software is being purchased. In addition, stand alone programs of the type that require high security such as payment programs or programs using sensitive data cannot be made for wide usage.

Some software companies offer a demonstration version of their software, for people to evaluate prior to purchase. The problem with these demonstration versions is that hackers can use these demonstration versions to break the software protection mechanisms. As a result, the software vendors cripple these demonstration versions.

Other software protection requirements include protecting databases from being used not as directed by its owner. For example, suppose a phone directory program is sold to individuals. A hacker can then extract the database and use the home directory database in unlawful manners, such as lookup of personal information from a given phone number, or requesting the personal information of all people living in a building or in a certain block.

Additional software protection requirements include protecting programs from being altered by hackers. An altered program can result in changing policies of software rules by a hacker. Protecting the execution environment of software is another important issue. If the execution environment of a program can be altered by a hacker, security measures built into a program can be circumvented and the program can be used in manners undesired by the program maker. This may result in using protected data in ways not allowed by the data owner.

There are different software protection mechanisms being used today. Some programs use an internal protection mechanism in software. This method however is easily circumvented by a hacker analyzing the authentication process and breaking it.

Some software protection mechanisms rely on an external device which may be used as an external authentication agent. This however is easily circumvented by a hacker analyzing the authentication process on the computer or device and breaking it.

Some software protection mechanisms are tied to a storage device that may protect data using storage device protective capabilities. Protection may be carried out autonomously by storage device logic that may limit access to certain data residing on physical memory of storage device. This however is limiting in that mixing storage and data protection causes dependency between the storage unit and the data protection. In addition this manner of protection usually requires execution to be carried out on hardware located on the storage unit. Execution on storage unit hardware still requires protection of storage unit execution environment.

Some software protection mechanisms operate by requiring the user to be online for example on the Internet while using the software. In this scenario, the software installed on the user's device is incomplete and some portions are carried out online. The problem with this mechanism is that network connection is not always available and can be a major drawback for people wishing to use the software when not connected to the Internet. In addition, network speed and congestion may be a limiting factor for the execution of the protected software. Another major disadvantage of the online protection mechanism is that enterprises that are careful about protecting their data and network do not wish their software to transfer data outside the organization.

Another method for protecting software is to use a hardware protection mechanism which may be implemented within a processor. One of these hardware methods is the Lockbox technology implemented by Analog Devices. http://www.analog.com/processors/blackfin/lockboxSecureTechnology.html In Lockbox technology, a confidential execution mode of the CPU is introduced. Entering this mode of execution must follow an authentication process. Part of internal on-CPU non volatile memory is only accessible during this confidential execution mode. Furthermore, during confidential execution, access to CPU registers and internal volatile memory is restricted and controlled by executing confidential code. In this manner it is possible to form an environment where confidential computations may take place without allowing reading or altering of confidential information.

The lockbox technology however is limited in that specific code in a specific manner must be written for a specific family of chips. Such protection is usually useful for embedded software. The available memory on the chip is usually small due to the high cost of implementing on-chip memory. The complex authentication process with the limitation of memory, both volatile and non-volatile and the complication of embedded environment development limits and makes the software development process difficult and complex.

It is an object of this disclosure to allow securing of software in a manner that protects software execution environment and prevents code alteration, modification, code viewing, and duplication using a high level programming language and without small memory constraints.

There is thus a widely recognized need for way to protect software and data that would prevent software copying, database access and code viewing while protecting program execution environment and protecting programs from being altered during execution. There is a widely recognized need for this capability in a unit that is an independent, separate entity from a computing device and from a storage device and it would be highly advantageous to have such a method devoid of the above limitations.

SUMMARY OF THE INVENTION

According to one aspect of the present invention there is provided a software protection device for carrying out computations in a protected environment, the device comprising:
  a decryption functionality unit capable of decrypting protected files;
  a program execution environment for executing computer program code;
  whereby at least a partly encrypted program may be decrypted by said decryption unit and executed by said program execution environment within said software protection device thereby allowing protection of code contents and executing program environment from outside of said software protection device.

According to a second aspect of the present invention there is provided a method for executing a protected program in a protected manner using a software protection device the method comprising:
  a. sending one or more at least part of at least partially encrypted programs to said software protection device;
  b. decrypting said at least one part of one of said at least partially encrypted programs within said software protection device into at least one partially decrypted program part;
  c. executing said at least one partially decrypted program part within said software protection device;

According to a third aspect of the present invention there is provided a secure software protection core capable of limiting access to restricted data for carrying out computations in a protected environment, the software protection core comprising:
  a processing unit;
  internal volatile memory;
  internal non-volatile memory;
  means of protecting access to at least part of said internal non-volatile memory;
  a program execution environment for executing computer program code using said processing unit;
  an internal decryption capability;
  whereby at least partially encrypted program may be decrypted using said internal decryption capability using keys stored in said internal non-volatile memory protected by said means of protecting access to at least part of non-volatile memory to be executed by said program execution environment using said internal volatile memory.

According to a fourth aspect of the present invention there is provided a software protection device for carrying out computations in a protected environment, the device comprising:
  An authentication functionality unit capable of authenticating files;
  a program execution environment for executing computer program code;
  whereby at least a partly authenticated program may be authorized by said authentication unit and executed by said program execution environment within said software protection device thereby allowing protection from alteration of code contents and executing program environment from outside of said software protection device.

According to a fifth aspect of the present invention there is provided a method for executing a protected program in a protected manner using a software protection device the method comprising:
  d. sending one or more at least part of at least partially authorized programs to said software protection device;
  e. authorizing said at least one part of one of said at least partially authorized programs within said software protection device.
  f. executing said at least one partially authorized program part within said software protection device;

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

Figure 1:
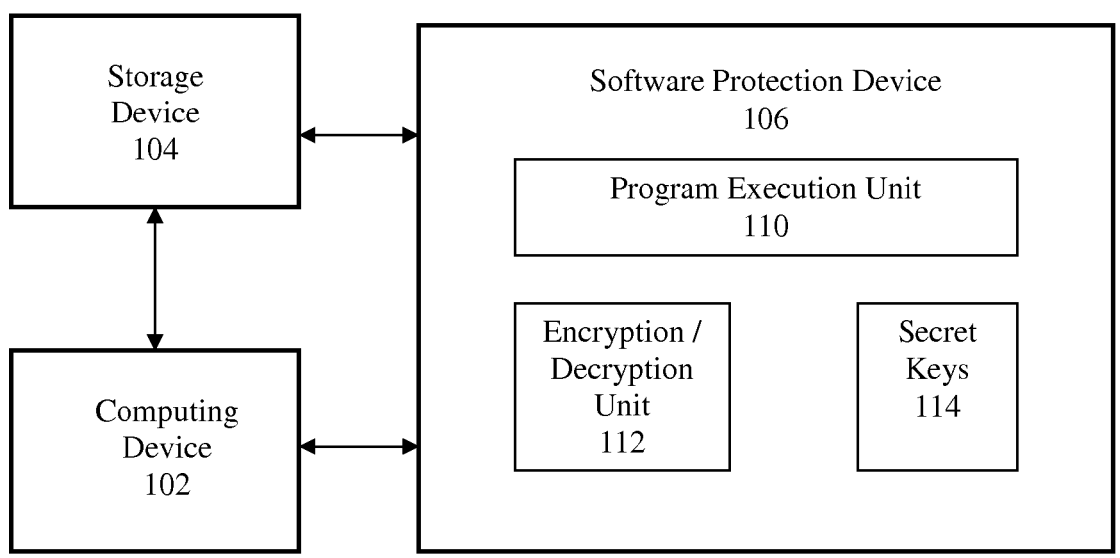
FIG. 1 is a block diagram illustration of an autonomous software protection device connected to a computing device and a storage device, in accordance with an embodiment of the present invention.

It will be appreciated that, for simplicity and clarity of illustration, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DESCRIPTION OF THE PREFERRED EMBODIMENTS

The preferred embodiments teach an autonomous software protection device for protecting software files and data files stored on a data storage unit. Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention includes several embodiments that can be realized using the autonomous software protection device described herein. In this disclosure, an autonomous software protection device for executing protected software via an external interface is described, where the interface is controllable from an external device such as a computer to which it is connected via a data link such as a USB connector. The autonomous software protection device further comprises an internal decryption unit and an internal program execution unit such as a Java Virtual Machine. The internal decryption unit decrypts protected encrypted software for internal execution unit. The internal execution unit is capable of carrying out programs within autonomous software protection device. The autonomous software protection device can therefore execute protected software in a secure computing environment within autonomous data storage device. Protected software may optionally make use of protected encrypted data files that can be decrypted by the internal decryption unit within the autonomous software protection device. Software execution results can then be sent to external device without revealing the content of the protected code and optional data files.

Software that executes in a digital appliance such as a computer can send requests to execute protected programs on software protection device. These protected programs are inaccessible directly by the digital appliance. These protected programs execute within software protection device internal program execution unit. Software on digital appliance may receive results from execution of such inaccessible program and only then may complete its tasks.

Executing software in this manner, such that unprotected software part executes on digital appliance and protected software part executes on software protection device, may together form one entity of protected software execution. Executing software in this manner allows several advantages such as protecting the entire software from being duplicated, reversed engineered and so forth; allowing to execute software according to set policies; allowing usage of content files according to set policies; preventing software code and data from being altered and thus adding a secure measure and a confidence measure to the software; allowing the execution of software in a protected environment; allowing program and content downloading without compromising data content such as by using encrypted files; allowing usage of protected software and protected data content even when there is no network connection available.

In the description herein below, the term Digital Appliance refers to a digital appliance such as a computer, a multimedia player, a mobile phone etc.

In the description herein below, the term Script Interpreter refers to a program that takes a file as input and executes it directly without needing to compile the input file first. Some examples of script interpreters are C-shell, Perl, Bourne Shell etc.

In the description herein below the term Java Virtual Machine or JVM refers to an abstract computing machine whose instruction set is called Java bytecode, where Java is a computer programming language.

Reference is now made to FIG. 1, which is a block diagram illustration of a software protection device connected to a computing device and a storage device, in accordance with an embodiment of the present invention comprising computing device 102, storage device 104, and software protection device 106 capable of communicating with each other. Software protection device 106 comprising program execution unit 110 which may be a Java Virtual Machine, Encryption/Decryption unit 112 and secret keys 114. In the preferred embodiment, protected software is located on storage device 104 in a sector-encrypted manner such that each requested sector may be independently decrypted by internal encryption/decryption unit 112.

Computing device 102 may request software protection device 106 to make a computation using encrypted program files and optional encrypted data files stored on storage device 104. Software protection device 106 then initiates program execution unit 110 which receives protected program files and optional protected data files in a decrypted form using the encryption decryption unit 112 and secret keys 114 used for the decryption process. Computation takes place within program execution unit 110 and result may be sent out to computing device 102. The decryption process may form an authentication process since encrypted program should be decrypted using keys in secret keys 114.

In this manner a computation is entirely being carried out in a secure environment where the user has no access to decrypted protected programs, decrypted protected data, and to intermediate computed values. In embodiments where the entire computation takes place within a single processor that includes decryption unit and program execution unit, data may remain secure from outside user intervention.

Encryption/decryption unit 112 is not required to be a physical unit but may be a program capable of encryption and decryption. Similarly, program execution unit 110 is not required to be a physical unit but may be a program capable of executing programs such as a Java virtual machine implementation in code that is executed on a CPU. The term unit is for clarification only and applies for a unit of functionality which is not necessarily a physical entity.

In some embodiments storage device 104 includes RAM. In some embodiments storage device may be a part of software protection device. In some embodiments storage device may contain non-volatile memory such as flash memory.

Figure 4:
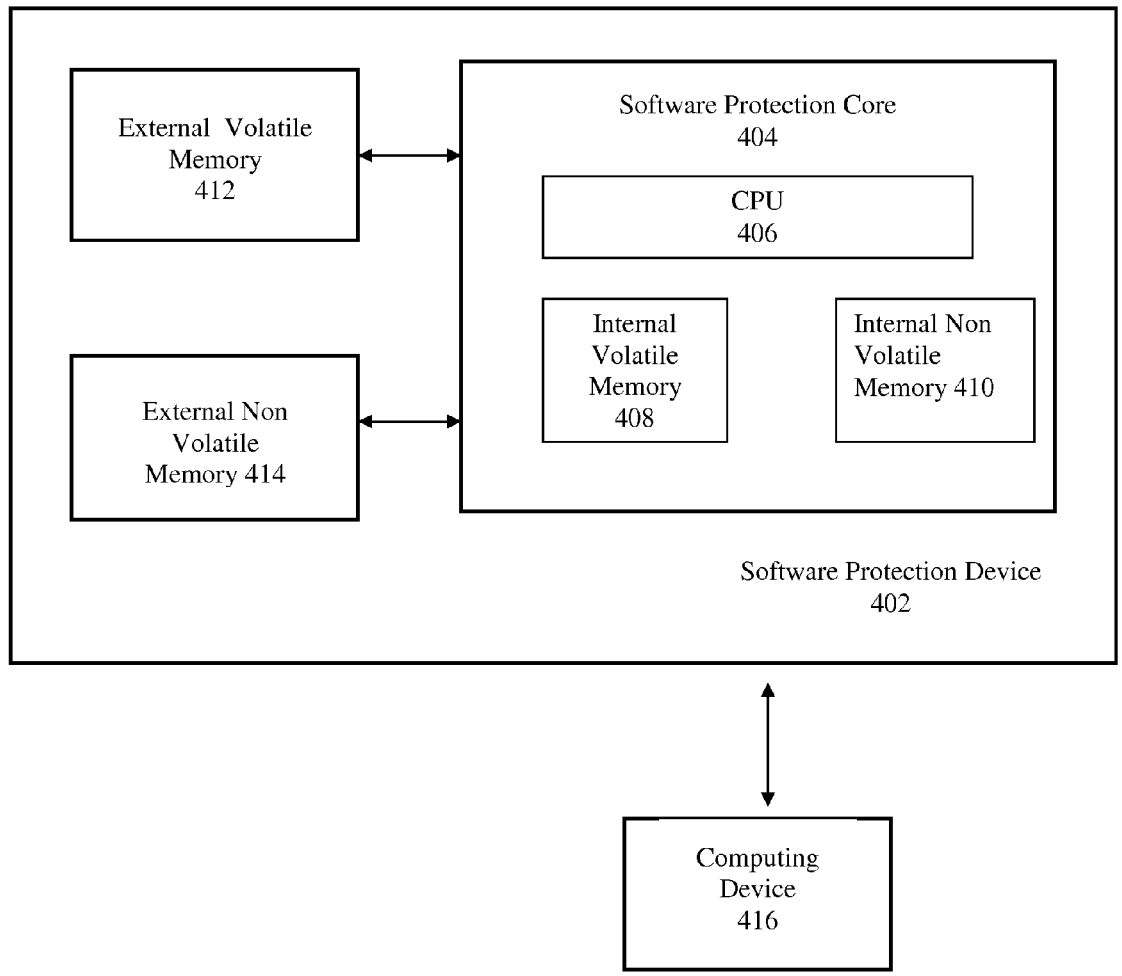
FIG. 4 is a block diagram illustration of an autonomous software protection device having a protective core connected to a computing device, in accordance with an embodiment of the present invention.

In some embodiments decryption is made on the fly as requested by program execution unit by having encrypted files encrypted in a sector-based manner. FIG. 4 explains this issue in more detail.

In some embodiments, protected software is downloaded in an encrypted form and is then transformed to a sector oriented encryption using the software protection device. This issue is further explained in FIG. 4.

The issue of splitting up a program so that part of the program is protected and carried out in a protected environment is explained in patent Ser. No. 11/518,923 System and Method for Software and Data Copy Protection filed Sep. 12, 2006 by the present inventor. Presented are some examples of executing a portion of a program in a separate, secure environment allowing to protect an entire program. Suppose a program is a word processor program having a spell-checking feature. Program running on computing device may be the word processor program without the spell checking feature enabled. The spell checking feature is packaged as a secure program file code that can search in a dictionary to find the existence of a certain word within a dictionary, or to find closely related words if the exact word is not found. In this example a protected data file includes a dictionary of the English language to be used with protected spell checking program code. If a user copies the word processing program, the user will not be able to execute spell checking for that copied word processor because the spell checking feature requires protected data code and protected data file. This example illustrates the difficulty of reverse engineering protected code and data file, since even if many documents are checked for spelling, not all words in the English language will be revealed and the algorithm for suggesting related words is not revealed. In a similar manner, other programs can be split to allow protecting algorithms and data files, hence allowing to protect original programs.

Another example of splitting a program may include content data files such as audio files, files containing book information, video information etc, which may be used as secure data files. Data files can be added or removed. This invention does not limit a program to be a static single program. In this case secure program code may be a full or partial content playing or rendering mechanism, a streaming mechanism etc.

Another example of splitting a program may include a game program in which one or more of its algorithms are executed within program execution unit. Program execution unit is sent information regarding game state and player state and programming execution unit calculates information necessary for the continuation of the game. In some embodiments internal state may be kept within software protection device for ongoing computations.

In some embodiments secure program code is written in a manner such that its execution requires relatively low CPU and a small volatile memory footprint to be executed in a resource limited environment.

In some embodiments the program execution unit may make use of compiled code and execute programs by executing compiled code. In the present embodiment Java Virtual Machine is used as program execution unit. Java programs may be executed within a virtual machine allowing a general implementation of an execution environment within software protection device. With Java there is no need to compile or link the program with the execution environment itself. Furthermore with Java, a program may be developed on any platform and does not require special development for an embedded environment for example. In other embodiments other manners may be used other than Java such as program interpreters, scripting languages or units that can execute compiled code. In some embodiments Java Virtual machines with just in time compilers may be used. Program execution environment may be in fact a layer between hardware and executing program, so that executing program is not executed by the hardware itself but by another program.

In some embodiments, protected code and protected data files may reside on a storage device of the computing device. In some embodiments the software protection device may have storage capacity for storing protected data and code. In some embodiments storage may reside elsewhere, for example on the network.

In some embodiments computing device may be an integral part of software protection device. In some embodiments computing device may use the same processor as software protection device. In some embodiments software protection device may be implemented within a multi-core CPU alongside other computing functions. In some embodiments, software protection device may be implemented in one core of a multi-core CPU while computing device may be implemented in another CPU core. In some embodiments software protection device may be callable over a network. Numerous manners of utilizing a software protection device may be realized.

In some embodiments only partial decryption of encrypted program code and/or partial portions of encrypted data files are required. In some embodiments partial portions of program code and data may be encrypted while the rest may be unencrypted. In some embodiments only data files may be encrypted and program may be unencrypted.

In some embodiments encryption takes place using symmetric encryption techniques such as AES. In some embodiment asymmetric encryption techniques may be used or a combination may be used. Secret keys store within software protection device may be updated for new programs.

In some embodiments, there are requirements that execution of code be carried out in an environment that that may not be altered. In such environments there is not always a requirement that the class file contents be encrypted. In such embodiments it is possible to only use authentication mechanisms and encryption may not be necessary for code protection. In these embodiments, a class file is authenticated by an electronic signature. Software protection device includes an authentication engine and internal keys for authenticating electronic signatures. Software protection device does not necessarily include an encryption/decryption unit. Authenticated class files are then sent as input into software protection device. Following to the authentication process, class files may be executed by the internal program execution unit such as a Java virtual machine in a protected environment. Authenticated class file is executed safely since the electronic signature authorizes the class to be identical to the class the electronic signature has been made for. The class file may make use of authenticated data files or encrypted data files as is necessary for the class and the data used by the class.

In some embodiments software protection device may be able to switch between different security modes. For example, two security modes may be available, a secure mode and a non-secure mode. Entering a secure mode may require an authorization process. For an authorization process, some non-volatile memory may be reserved and be inaccessible outside of software protection device and may be used internally in software protection device only during authentication process and during secure mode. Such reserved non-volatile memory may hold secret information such as secret decryption and authorization keys. Secure computation may take place only while the software protection device is in secure mode of operation. The authorization process is necessary in order to make sure only authorized programs may reach secret information stored in reserved non-volatile memory. In this manner only signed secure programs may be executed in secure mode and read secret information. In some embodiments, in secure mode, access to some volatile memory and registers as well as debugging information such as JTAG debugging may be limited or disabled from outside of said software protection device. In some embodiments, the code for the authorization process itself may reside in inaccessible non volatile memory within software protection device.

Figure 2:
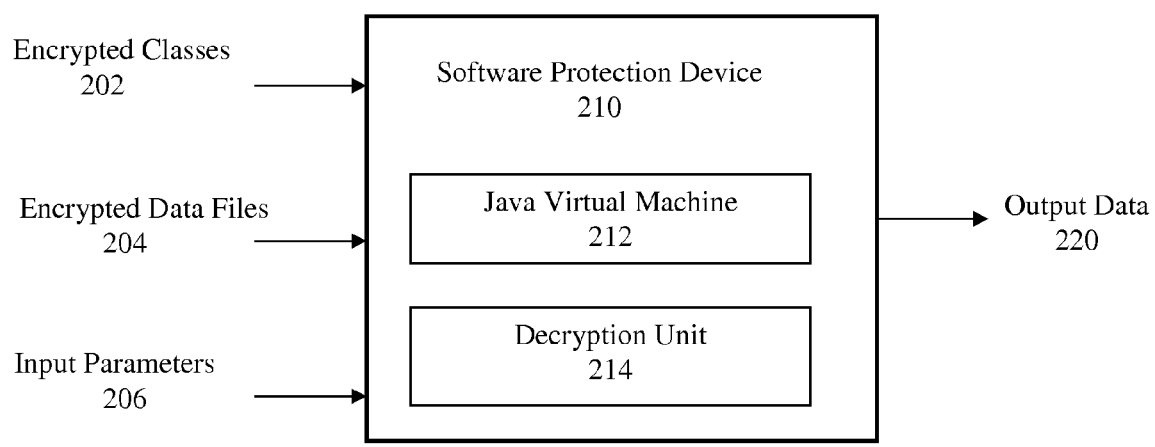
FIG. 2 is a block diagram illustration of an autonomous software protection device, in accordance with an embodiment of the present invention.

Reference is now made to FIG. 2, which is a block diagram illustration of an autonomous software protection device, in accordance with an embodiment of the present invention comprising a software protection device 210. The software protection device 210 comprises a Java Virtual Machine referred to herein as JVM unit 212 and a decryption unit 214. The software protection unit 210 receives the following inputs: encrypted classes 202, encrypted data files 204 and input parameters 206. The software protection unit outputs output data 220. The encrypted classes 202 used as input to software protection device, are decrypted by decryption unit 214 and sent for execution in JVM unit 212 within software protection device 210. The encrypted data files 204 used as input are decrypted by decryption unit 214 and used by executing class in JVM unit 212 within software protection device. The input parameters to software protection device 206 are used by executing class in JVM unit 212 within software protection device.

In the manner described above, contents of secure classes and secure data files are never exposed in a decrypted form outside of software protection device. In addition, no sub computation state is exposed outside of software protection device. Entire computation is carried out internal to software protection device outputting only the end result.

Figure 6:
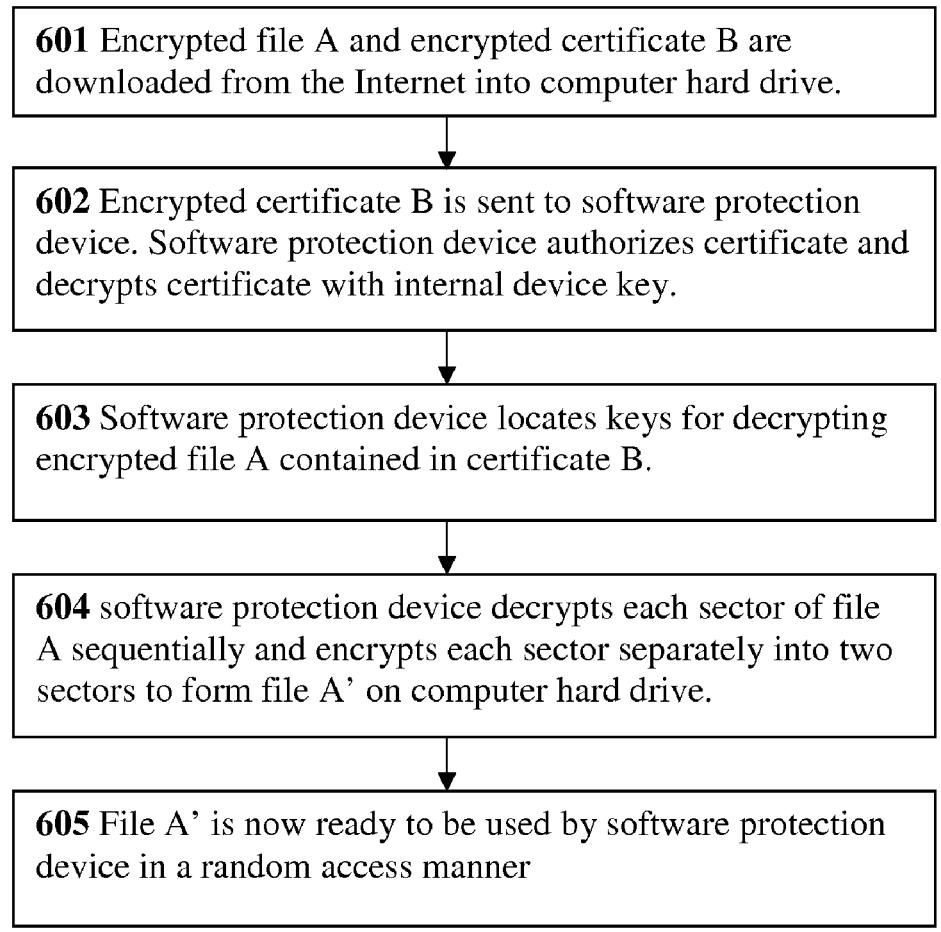
FIG. 6 is a schematic flowchart for securely sending new protected content to computing device using a software protection device, in accordance with an embodiment of the present invention.

In the preferred embodiment, encrypted classes and encrypted data can only be used by one specific software protection device. A different software protection device contains different sets of secret keys and cannot use the encrypted classes and data files. FIG. 6 explains in detail how to send different encrypted versions to different users.

In the preferred embodiment each secure file includes its usage rights. Only if usage rights criteria are met, program may be carried out in software protection device. See FIG. 6 regarding certificates for more details.

In the preferred embodiment a Java virtual machine and the Java language is used, allowing for code to be used on a Java virtual machine without requiring building for the specific software protection device environment, allowing flexible code development and execution allowing for example for code downloading and code usage in a dynamic manner.

In the manner described above it is possible to carry out computations in a manner that is secure from code alteration, copying and unauthorized usage. This is assuming the software protection unit is a unit that does not allow a hacker to peek into its registers and memory during the time when secure computations take place.

In some embodiments, authentication of code may be a sufficient to fulfill program execution and no requirement for program code encryption may exist. In this case, where a program is authenticated prior to being executed, program execution code may be viewed but the program may not be altered. In such an embodiment encrypted data files may be used by executing authenticated program, and/or authenticated unencrypted data files may be used.

Figure 3:
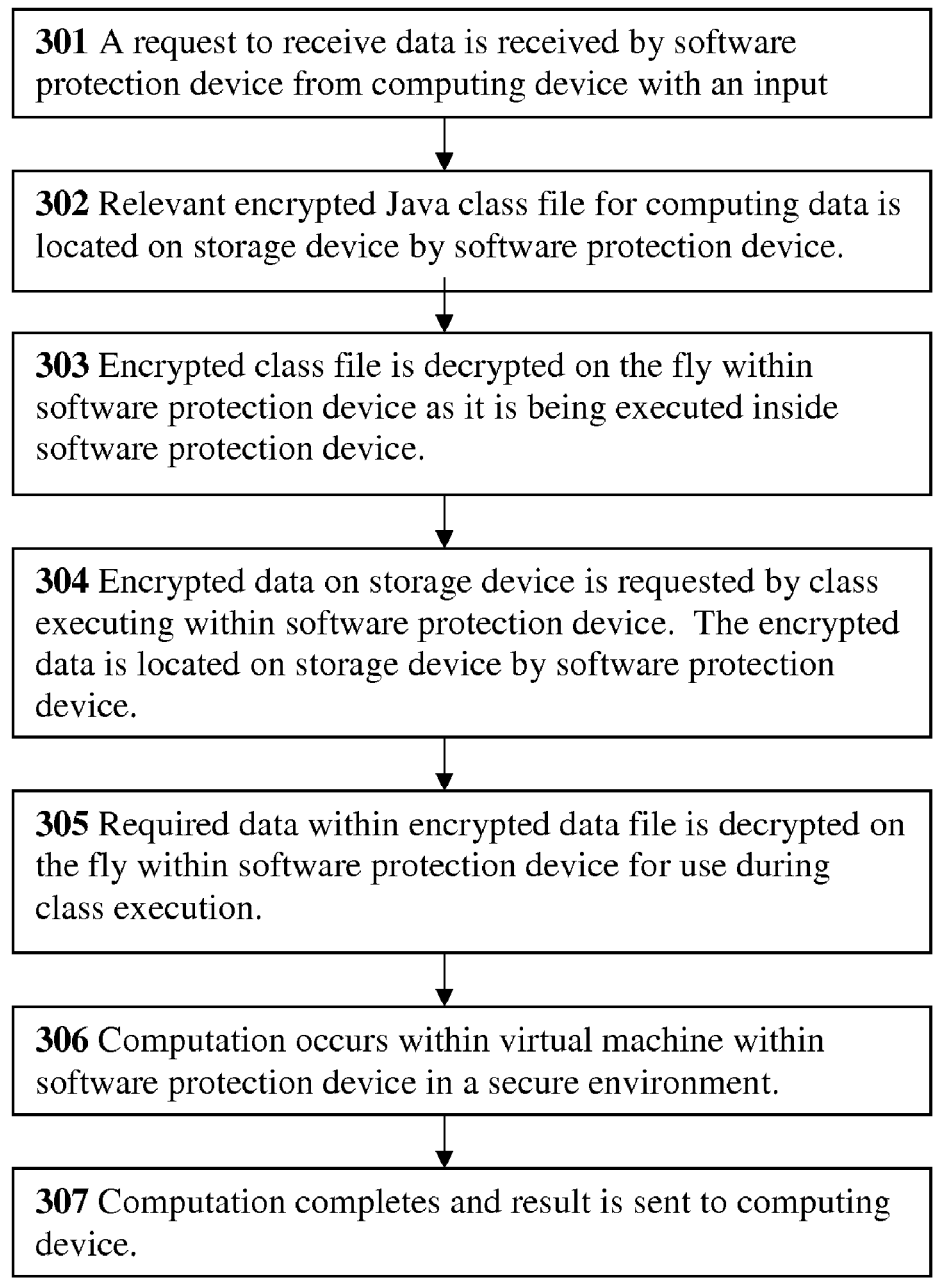
FIG. 3 is a schematic flowchart for securely carrying out a requested computation by autonomous software protection device for computing device, in accordance with an embodiment of the present invention.

Reference is now made to FIG. 3, which is a schematic flowchart for securely carrying out a requested computation by autonomous software protection device for computing device, in accordance with an embodiment of the present invention.

In step 301 a request to receive data is received by software protection device 106 from computing device 102. The computing device may also send an input parameter with request. Optionally locally stored data may be used in computation.

In step 302 relevant encrypted Java class file for computing data is located on storage device 104 by software protection device. At this step Java class file is in encrypted and secured form. Further information regarding the placing of encrypted files on storage device in FIG. 6

In step 303 encrypted class file is decrypted on the fly within software protection device as it is being executed inside software protection device. Decryption is carried out by encryption decryption unit 112 using secret keys 114 located inside software protection device. Execution of class is carried out by internal program execution unit 110, which is a JVM in the preferred embodiment. The requested class exists in decrypted form only within internal memory of software protection device and is not exposed outside of software protection device, keeping class contents secure. Execution of class is carried out within software protection device and is not exposed outside of software protection device.

In step 304 encrypted data file on storage device is requested by class executing within software protection device. The encrypted data is located on storage device by software protection device in a similar manner as in step 302.

In step 305 required data in encrypted data file is decrypted on the fly within software protection device for use during class execution. The executing class makes use of data file for its computation. The data file exists in decrypted form only within internal memory of software protection device and is not exposed outside of software protection device, keeping data file contents secure.

In step 306 computation of requested class occurs within JVM located within software protection device in a secure environment. Execution of class is carried out within software protection device and is not exposed outside of software protection device. In this manner computation is safe from alteration and viewing its code when executing in a secure environment. A secure environment may exist in a case where software protection device is able to protect its environment from outside when executing secure computations.

In step 307 computation completes and result is sent to computing device.

This series of steps displays how a program, optionally making use of external data files may be carried out securely within software protection device without exposing code or data externally to software protection device. In this manner code may be unalterable and may be used only according to its set policies. In the preferred embodiment where specific encrypted code and data can only be decrypted by a single specific software protection device, the code and data files cannot be duplicated.

Reference is now made to FIG. 4, which is a block diagram illustration of an autonomous software protection device having a software protection core connected to a computing device, in accordance with an embodiment of the present invention comprising computing device 416 and software protection device 402 capable of communicating with each other. Software protection device 402 comprising a software protection core 404 capable of communicating with external volatile memory 412 and external non-volatile memory 414. Software protection core 404 comprising CPU 406, internal volatile memory 408 and internal non-volatile memory 410.

In the preferred embodiment, confidential code and/or data files may be in encrypted or partially encrypted form. In the preferred embodiment confidential encrypted information may be present in decrypted form only within software protection core. Furthermore, processing of confidential information in decrypted form takes place within software protection core in CPU 406. In this manner entire handling of decrypted confidential information takes place within software protection core and is not visible outside software protection core. In the preferred embodiment, functional components of FIG. 1 software protection device 106 which are program execution unit 110 such as JVM and encryption/decryption unit 112 using secret keys 114 execute within software protection core 404. CPU 406 carries out JVM and encryption/decryption within software protection core 404 using internal volatile memory 408. Secret keys may be stored in internal non-volatile memory 410.

Protection of software protection core 404 becomes a necessity in order to keep computations confidential. During confidential computation, protection of software protection core is relevant to CPU 406 and to at least part of internal volatile memory 408. Protection is relevant at all times to at least part of internal non-volatile memory 410 since it may contain secret keys. Protection of software protection core may be achieved in different manners. One example is to physically disable debugging and monitoring CPU such as by removing JTAG connectors and other connectors, possibly using a mold to prevent connection to connectors of software protection core. Another example for protecting software protection core is to use a hardware protection mechanism which may be implemented within a processor. Such a mechanism is the Lockbox technology implemented by Analog Devices and explained in the background part of this invention. In Lockbox technology, a confidential execution mode of the CPU is introduced. CPU includes internal volatile and non volatile memory. Entering confidential mode of execution must follow an authentication process. Part of internal non volatile memory 410 is only accessible during confidential execution mode. Furthermore, during confidential execution access to CPU 406 and internal volatile memory 408 is restricted and controlled by executing confidential code. In this manner it is possible to form an environment where confidential computations may take place without allowing reading or altering of confidential information. Having a JVM and decryption taking place within such secure environment allows the protection of software that is written in a standard high level language without requiring compiling and linking especially for embedded environments.

External volatile memory 412 and external non-volatile memory 414 may be used in order to expand and support software protection core 404. External resources may aid computations within software protection core but on the other hand should not risk compromising confidential information which may be exposed, viewed and tampered with. In the preferred embodiment external volatile memory may be used as additional memory for confidential computation in the form of encrypted virtual memory. Making use of such virtual memory is possible using a JVM implementation which is capable of using volatile memory and additional virtual memory which may also be encrypted. This JVM implementation is explained in utility patent application Ser. No. 11/750,331 System and Method for Virtual Memory and Securing Memory in Programming Languages by the present inventor referred to herein as patent A. According to patent A, a JVM may implement a virtual memory mechanism that works internally to the Java computer language and may include security features protecting swapped out program memory.

The mechanism of patent A in addition to other issues makes use of the fact that JVM conducts a range check prior to each memory access. Leveraging on memory range checks, each memory access may point to a virtual memory address allowing virtual memory to take place. Security measures may be applied for example by encrypting memory before it is swapped out and by decrypting memory when it is swapped in.

Using a JVM according to patent A, external volatile memory may be used as virtual memory by holding swapped out memory for JVM in encrypted form. JVM implementation according to patent A makes use of virtual memory in a way that each memory segment that is swapped out during virtual memory action is encrypted prior to being moved to virtual memory space and each swapped in memory segment is decrypted within software protection core. In the preferred embodiment encryption/decryption unit is used for encryption of JVM virtual memory before it leaves software protection core and for decrypting JVM virtual memory when it returns to software protection core.

In this manner it is possible to utilize external volatile memory and/or external non-volatile memory for secure computations even though external memory may be unsecured and accessible outside software protection device.

Utilizing external memory allows using a larger memory than the internal available memory within software protection core. This allows programmers to create secure computations using a high level language such as Java with a large memory pool even though software protection core includes very limited resources.

In some embodiments external non-volatile memory and/or internal non-volatile memory may hold information in an encrypted form to serve during a secure computation or to serve as a secure data store between secure computations.

In some embodiments it may be possible to decrypt code and/or data files in a manner in which each file portion may be reached and decrypted separately. This manner of access allows random access to encrypted file portions. This may be useful for example when entire program code and/or data are larger than internal volatile memory. This may also be useful for speeding up execution. In the preferred embodiment each portion such as block or sector is encrypted independently, allowing each portion to be decrypted and retrieved independently. In such implementation is may be possible to add additional data such as random data before and/or after each file portion in order to strengthen encryption. For example, it may be possible to encrypt each sector within a data size of two sectors where the real sector starts within random number bytes from start of first sector. Random data may fill empty data cells. Another example is to group a few sectors together and add a certain amounts of random bytes per sector. Sector may be placed in different locations within extra added bytes.

In the preferred embodiment, protected software and/or data files are located on storage device 104 in a sector-encrypted manner such that each requested sector may be independently decrypted by software protection device internal encryption/decryption unit 112. In this manner encryption/decryption may take place on the fly sector by sector without requiring encrypting/decrypting of file from start to end for each access.

Computing device 416 may request software protection device 402 to make a computation using encrypted program files and optional encrypted data files stored on storage device such as a storage device connected to computing device. Software protection device then initiates program execution unit 110 such as JVM executing in CPU 406 using internal volatile memory 408 and/or internal non-volatile memory 410. JVM receives protected program files and optional protected data files in a decrypted form using the encryption/decryption unit 112 and secret keys 114 used for the decryption process. Encryption/decryption unit 112 may execute in CPU 406 and secret keys may be stored in internal non-volatile memory 410. External volatile memory 412 and/or external non-volatile memory 414 may be used as memory space for computation providing confidential data is encrypted prior to being placed on this memory. Computation takes place within software protection core 404 in a secured manner and result may be sent out to computing device 416.

In this manner a computation is being carried out in a secure environment where there is no external access to decrypted protected programs, decrypted protected data, and no access to intermediate computed values. In this manner, data and/or code may remain secure from outside user intervention. The secure computation is written in a high level programming language that is not built together with the software protection core executing code but may be carried out in a virtual machine such as Java code. Furthermore, external unsecure memory is usable as virtual memory for carrying out the secure computation.

In some embodiments virtual memory is being stored on external memory by signing memory with a digital signature rather than encrypting virtual memory. This may allow a faster implementation and be applicable where it is most important for applications not to be altered. The digital signature may use secret keys located in software protection core.

Figure 5:
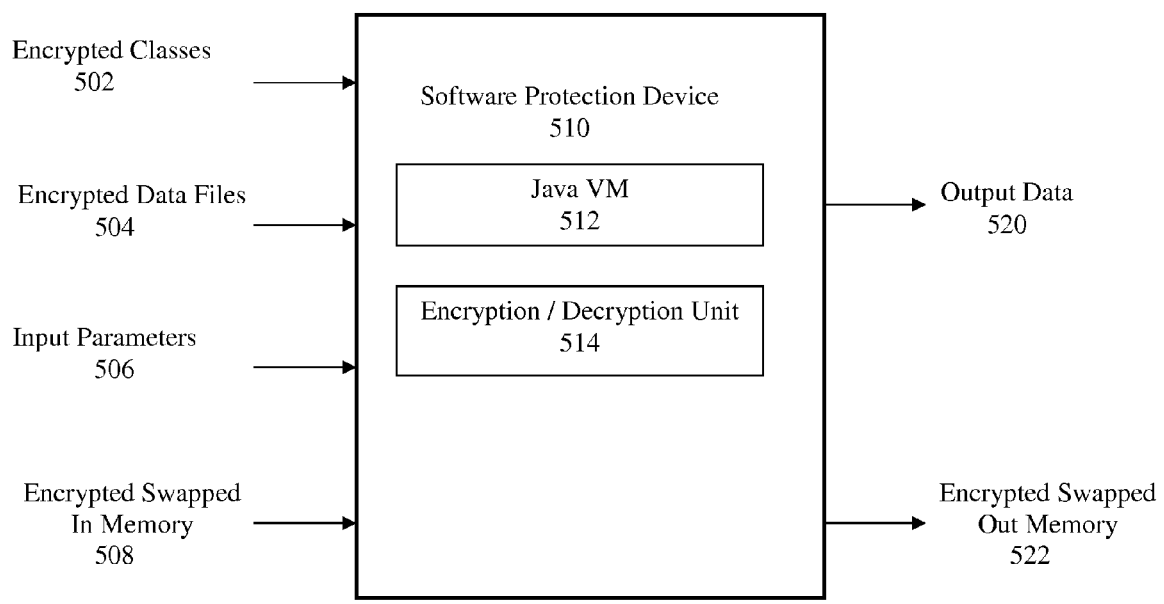
FIG. 5 is a block diagram illustration of an autonomous software protection device capable of using secured virtual memory, in accordance with an embodiment of the present invention.

Reference is now made to FIG. 5, which is a block diagram illustration of an autonomous software protection device capable of using secured virtual memory, in accordance with an embodiment of the present invention comprising a software protection device 510. The software protection device 510 comprises a Java Virtual Machine (referred to as JVM) unit 512 and an encryption/decryption unit 514. The software protection unit 510 receives the following inputs: encrypted classes 502, encrypted data files 504, input parameters 506 and encrypted swapped in memory 508. The software protection unit outputs output data 520 and encrypted swapped out memory 522. This figure closely resembles FIG. 2 with the addition of encrypted virtual memory usage. The encrypted classes 502 used for input to software protection device, are decrypted by encryption /decryption unit 514 and sent for execution in JVM unit 512 within software protection device 510. The encrypted data files 504 used as input are decrypted by encryption/decryption unit 514 and used by executing class in JVM unit 512 within software protection device. The input parameters to software protection device 506 are used by executing class in JVM unit 512 within software protection device. In this embodiment secondary memory external to software protection device may be used as secure virtual memory for computation. This memory may be used securely even though its contents may be unprotected and easily viewed. This protection takes place in a manner that memory as it is paged out, is encrypted by encryption/decryption unit prior to being output to secondary memory, as encrypted swapped out memory 522. When swapped out memory is required executing code on software protection device, swapped out memory is input into software protection device as encrypted swapped in memory 508. This memory is then decrypted by encryption/decryption unit 514 internally in software protection device and may then be used as normal data in software protection device memory.

In the manner described above, secure classes and secure data files are never exposed in a decrypted form outside of software protection device, nor is any sub computation state exposed outside of software protection device. Furthermore all swapped out memory located outside software protection device is encrypted. Entire computation is carried out internal to software protection device outputting only the end result.

In the preferred embodiment and as mention in FIG. 4, a special JVM is being used for managing virtual memory. In the preferred embodiment external volatile memory may be used as additional memory for confidential computation in the form of encrypted virtual memory even though external memory may not be secure or protected. Making use of such virtual memory is possible using a JVM implementation which is capable of using local memory and additional virtual memory. This additional memory may then be kept encrypted. This JVM implementation is explained in utility patent A mentioned in FIG. 4.

In the preferred embodiment, encrypted classes and encrypted data can only be used by one specific software protection device. A different software protection device containing different sets of secret keys cannot use the encrypted classes and data files. FIG. 6 explains in detail how to send different encrypted versions to different software protection devices.

In the preferred embodiment each secure file includes its own usage rights. Only if usage rights criteria are met, program may be carried out. See FIG. 6 regarding certificates for more details.

In the manner described above it is possible to carry out computations in a manner that is secure from code alteration, copying and unauthorized usage. In addition, the code is written in the high level language Java that stand alone and does not require to be linked with the protection device own software. Furthermore the code may use virtual memory external to software protection device, not limiting the memory usage to only memory present in the software protection device. This protection of code assumes that software protection unit is a unit that does not enable a hacker to peek into its registers and memory during the time when secure computations take place.

Reference is now made to FIG. 6, which is a schematic flowchart for securely sending new protected content to computing device using a software protection device, in accordance with an embodiment of the present invention.

In step 601 encrypted file A and encrypted certificate B are downloaded from the Internet into computing device non-volatile memory, in this embodiment into a computer's hard drive. In this embodiment encrypted file A is encrypted in a symmetric encryption algorithm such as AES. Certificate file B is encrypted in an asymmetric encryption algorithm such as RSA where only software protection device attached to the computing device requesting the download, may have the capability to decrypt. In this embodiment, encrypted certificate B includes a key to decrypt file A, along with allowed usage information such as an expiration date of the data downloaded. In this embodiment file A may be sent to multiple users since the encrypted certificate B includes the hidden key to decrypt file A and this key is never revealed outside software protection device.

Certificate B may be decrypted only by specific software protection device while other software protection devices may not decrypt certificate B. A certificate may be made for a specific software protection device encrypted using its public key. In this manned it is possible to send files such as code and data to a specific device in a manner that unauthorized devices will not be able to make use of those encrypted files.

In step 602 encrypted certificate B is sent to software protection device. Software protection device authorizes certificate and decrypts certificate with internal software protection device key. Software protection device is now capable of decrypting encrypted file A using keys contained in certificate B which is now decrypted.

In the present embodiment, software protection device includes protected non volatile memory which is only readable within software protection device and only during the time software protection device is in a authenticated protected stage. This is possible for example using the Lockbox technology as mentioned earlier.

In step 603 software protection device locates keys for decrypting encrypted file A from decrypted certificate B. Keys for decrypting file A are contained in certificate B.

In step 604 software protection device creates a new encrypted file A' from encrypted file A as follows. Software protection device decrypts each sector of file A sequentially one after the other and then encrypts each sector separately into two sectors to form file A' on computer hard drive. The encryption of each decrypted sector C into two sectors D and E is done as follows. For each sector C two sectors D, E are filled with random numbers. The random numbers that fill sector D are chosen with one exception, so that each number located in byte place K is not equal to the value of K+1. Then a random number N between 64 and 192 is chosen. Decrypted sector C contents are placed within sectors D and E skipping N characters from the beginning of sector D and the rest N characters left over are filled into sector E from sector E beginning. At location N−1 of sector D the number N is placed. Following this, sectors D and E are encrypted together with an encryption key located in software protection device and written out to file A'.

These steps turns encrypted file A to a sector encrypted file A' on the computer hard drive. This means that software protection device with its internal keys may randomly decrypt any sector in file A' by directly accessing a sector and decrypting only that required sector.

In some embodiments each software protection device may use a different set of keys to build each A' type file. Therefore only specific software protection device can decrypt encrypted file A' while other software protection devices cannot decrypt file A'.

In step 605 file A' is now ready to be used by software protection device in a random access manner. This means software protection device can now decrypt any random sector of file A' separately, allowing software protection device to use encrypted code and data on the fly while computation takes place. Decrypting of a sector C is done as follows. Store the location of sector C from start of file A, denote this as sector number L. Locate sectors D and E representing sector C by taking two sector located at sector number 2*L from the beginning of the file A'. Next, sectors D and E are decrypted within software protection device. Sector D contents are examined from location 63 to 191 to find a location K with a value of K+1. Sector C is copied from location K+1 in sector D concatenated to beginning K+1 bytes from sector E. In this manner each sector in file A' may be randomly and independently accessed.

This series of steps displays how new secure data may be transmitted to users in a secure manner and transformed to data usable by software protection device for its computations. Software protection device may use encrypted code and data on the fly while doing its computations. In this manner secure data does not need to be placed in a decrypted form prior to processing, compromising data security.

In some embodiments software protection device may keep an internal table of all files that were converted in the manner described above. This information may be useful for FIG. 5 for example when encryption and decryption takes place for implementing virtual memory.

In some embodiments a more space conserving method may be used to turning one sector of file A into two sectors in file A'. For example, two sectors of file A may be placed into three sectors in file A', three sectors of file A may be placed into four sectors in file A' etc.

Figure 7:
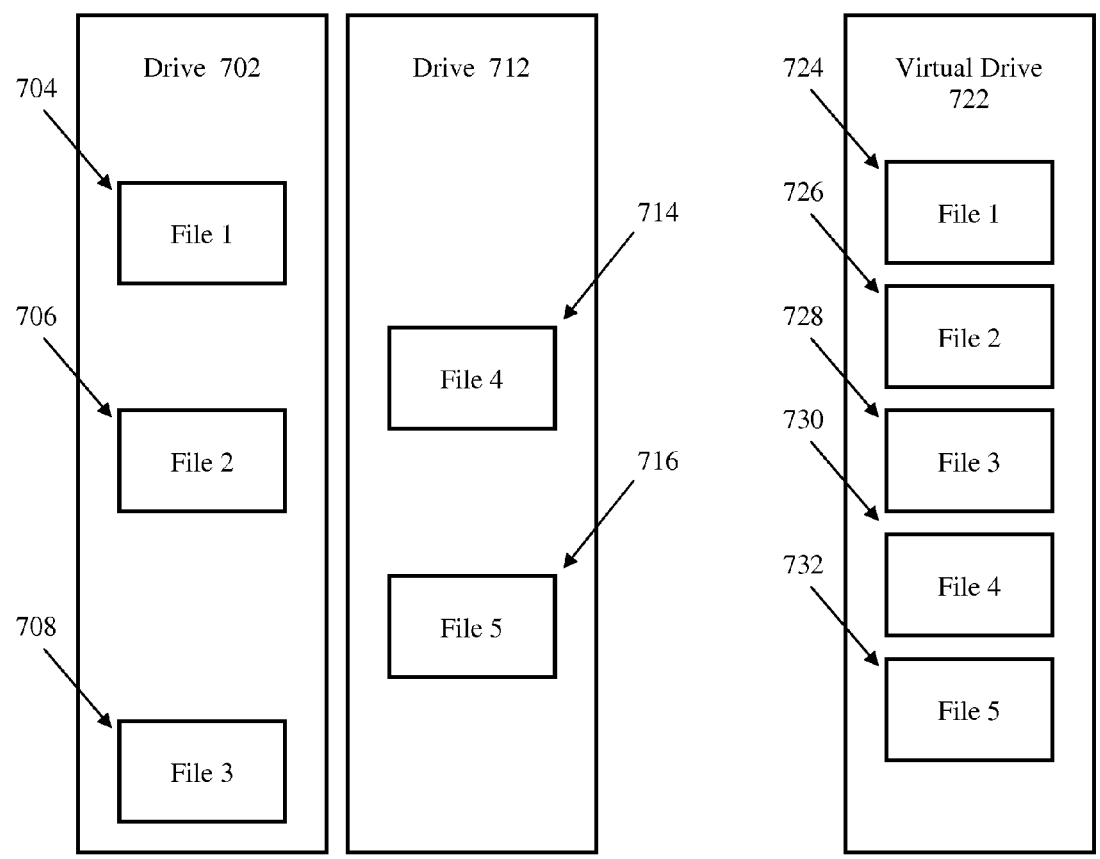
FIG. 7 is a block diagram illustration of a block diagram illustration of virtual files located on a virtual drive, in accordance with an embodiment of the present invention.

Reference is now made to FIG. 7, which is a block diagram illustration of virtual files located on a virtual drive, in accordance with an embodiment of the present invention comprising storage drive 702, storage drive 712 and virtual storage drive belonging to software protection device 722. Storage drive 702 includes protected files, file 1 704 file 2 706 and file 3 708. Computing device mounts storage drive 702 and views protected files file 1 704 file 2 706 and file 3 708 as standard files which contain encrypted data. In a similar manner storage drive 712 includes protected files, file4 714 file 5 716. The computing device mounts storage drive 712 and views protected files file 4 714 and file 5 716 as standard files which contain encrypted data. Computing device mounts software protection device as virtual drive 722 which includes the encrypted files of device 702 and device 712, file 1 724, file 2 726, file 3 728, file 4 730, and file 5 732. In addition, virtual drive 722 may manipulate its files and turn some of them to unencrypted files, as required by the programmer.

Virtual drive 722 is capable of showing files as if they are contained within virtual drive. Virtual drive may manipulate file contents. This is possible through the connection of the virtual drive to computing device and internal computational capabilities, such as displayed in FIG. 1. Virtual drive may be a software protection device with a connection to a computing device of the type which supports storage device capabilities, such as USB. Virtual drive may collect information about the location of protected files and display them as if the contents are within virtual drive. Virtual drive may affect file contents on the fly during operation, for example if files are sector-encrypted and may be decrypted on the fly.

In some embodiments software protection device may be mountable by computing device. In some embodiments software protection device does not contain storage space for data files. Software protection device may be mounted as a virtual storage drive to computing device. In this case the software protection device shows all files on different storage devices as if the files are located on it. In some embodiments, some files may physically be located on software protection device itself. In some embodiments virtual file may represent another format or form of the original file on storage, for example file on storage device may be encrypted and access to virtual file on virtual drive may reveal a decrypted file of the encrypted file.

In some embodiments making use of files on virtual software protection drive 722 may be different to accessing secure files on storage devices 702 and 712. For example, files located on software protection device may be usable for certain applications while files located on storage devices may not be used. That is because virtual drive may alter the contents of the encrypted files.

In some embodiments processing within software protection device takes place in order to manipulate secure files on storage devices to form virtual files on virtual drive. In some embodiments virtual files on virtual drive are processed on the fly using files in storage devices which do not exist by themselves.

In some embodiments of this invention a development kit for developing applications for software protection device may be made. This development kit may help development for software protection device on other computing appliances. The development kit may include an emulator for the software protection device. In the preferred embodiment the development kit may be a Java virtual machine simulating the environment of the software protection device.

The preferred embodiment makes use of a Java virtual machine for carrying out received external program code. The invention in not limited to a specific programming language. The invention is not limited to interpreted languages or virtual machines. In some embodiments program execution unit may execute compiled code or interpreted code. This environment is not restricted to interpreted languages, scripting languages, compiled bytecodes etc.

The present disclosure explains a software protection device in which encrypted java class files are being used as input to software protection device whereby software protection device may decrypt the class files internally and execute the class files internally. In some embodiments, there are requirements that execution of code be carried out in an environment that that may not be altered. In such environments there is not always a requirement that the class file contents be encrypted. In such embodiments it is possible only to use authentication mechanisms and encryption may not be necessary. In these embodiments, a class file is authenticated by an electronic signature. Software protection environment includes an authentication engine and internal keys for authenticating electronic signatures. Class files are then sent as input into software protection device where class files are being authenticated. Following to the authentication process, class files may be executed by the internal Java virtual machine in a protected environment. Authenticated class file is executed safely since the electronic signature authorizes the class to be identical to the class the electronic signature has been made for. The class file may make use of authenticated data files or encrypted data files as is necessary for the class and the data used by the class. The class file may be executed using the virtual memory mechanism described in this disclosure and in patent A; Virtual memory may be encrypted outside of software protection device. In other embodiments virtual memory may be digitally signed and not encrypted.

Figure 8:
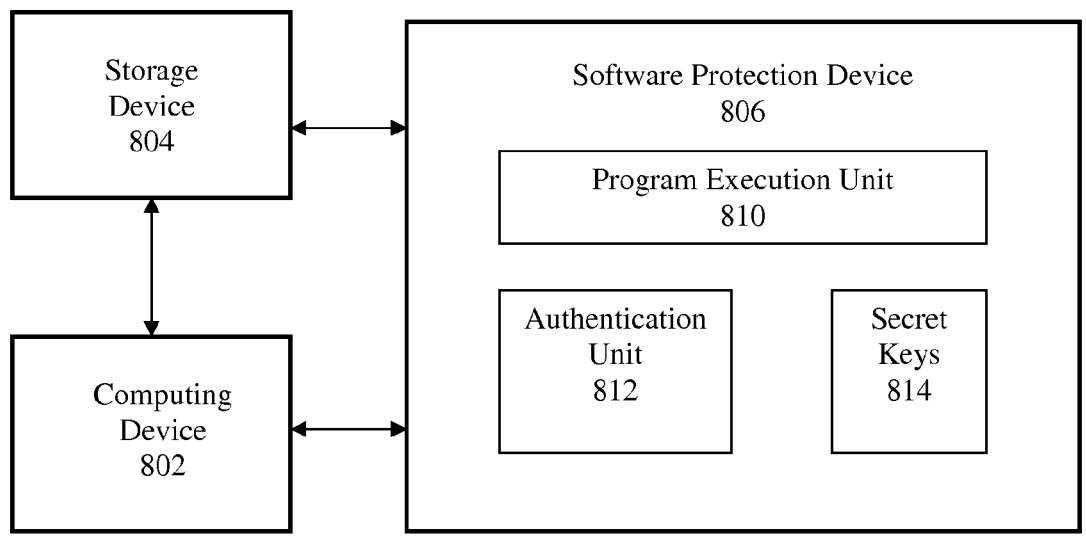
FIG. 8 is a block diagram illustration of autonomous software protection device with authentication capabilities connected to a computing device and a storage device, in accordance with an embodiment of the present invention.

Reference is now made to FIG. 8, which is a block diagram illustration of a software protection device with authentication capabilities connected to a computing device and a storage device, in accordance with an embodiment of the present invention comprising computing device 802, storage device 804, and software protection device 806 capable of communicating with each other. Software protection device 806 comprising program execution unit 810 which may be a Java Virtual Machine, Authentication unit 812 for authenticating digital signatures and in some embodiments for creating digital signatures, and secret keys 814. Computing device 802 may request software protection device 806 to make a computation using authorized program files and optional data files stored on storage device 804. Software protection device 806 then initiates program execution unit 810 which receives authorized program files and secret keys 814 used for the authorization process. Computation takes place within program execution unit 810 and result may be sent out to computing device 802.

Optional authorized data files may be used in computation process and similar to FIG. 1, a decryption engine may be used for decrypting encrypted data files.

In this manner a computation is entirely being carried out in a secure environment where the user has no access to authorized protected programs, authorized protected data, and to intermediate computed values. In embodiments where the entire computation takes place within a single processor that includes authorization unit and program execution unit, data may remain secure from outside user intervention.

Authorization unit 812 is not required to be a physical unit but may be a program capable of authorizing digital signatures. Similarly, program execution unit 810 is not required to be a physical unit but may be a program capable of executing programs such as a Java virtual machine implementation in code that is executed on a CPU. The term unit is for clarification only and applies for a unit of functionality which is not necessarily a physical entity.

In some embodiments storage device 804 includes RAM. In some embodiments storage device may be a part of software protection device. In some embodiments storage device may contain non-volatile memory such as flash memory.

In some embodiments authorization is made on the fly as requested by program execution unit by having digitally signed files signed for each sector or a file portion separately.

Patent A which is patent application Ser. No. 11/750,331 System and Method for Virtual Memory and Securing Memory in Programming Languages by the present inventor, is being used throughout this disclose. Some highlights are brought here.

Patent A discloses a digital device capable of executing a Java virtual machine. The Java programming language virtual machine described, implements a virtual memory mechanism internal to the Java programming language virtual machine. This mechanism does not rely on any external virtual memory capability external to the Java virtual machine, herein referred to as JVM.

Computer languages such as Java prevent direct access to memory. Instead, each memory access is first checked for validity and following that check, the actual memory address is accessed. This feature is used in disclosure of Patent A to implement the virtual memory mechanism. The JVM may implement this validity check feature by having a structure for each compound non-primitive type, such as arrays, instance objects etc, the structure holding information regarding that compound type.

An example of allocating memory to a data structure using the virtual memory mechanism is explained. The data structure memory may be first allocated through virtual memory allocation, by allocating a block of memory within an address space representing the entire virtual memory space. Subsequent access to data structure data is made using the indirect access of Java virtual machine to memory. Within the JVM code of indirect access to memory, commands are inserted to fetch requested data from virtual memory to main memory, thereby adding virtual memory features to data structures in JVM. Furthermore, some memory may be swapped out as requested.

The virtual memory mechanism is internal to the JVM and does not require external virtual memory mechanisms. The virtual memory mechanism may protect data that is currently swapped out on secondary memory as follows: Data is encrypted before being swapped out; When data is swapped in, data is then decrypted for use.

It may be appreciated by those skilled in the art of the present embodiments that the present embodiments allows to secure software in a manner that protects software execution environment and prevents code alteration, code modification, code viewing and code duplication. The software may be written using the Java programming language, offering the programmer a large virtual memory pool. Furthermore, the programmer is not required knowledge of embedded programming, encryption or authentication algorithms. The preferred embodiment has the following advantages over existing art:

- (a) The present invention protects software from code alteration or modification. Software execution occurs in a secure environment allowing usage even for sensitive or commercial usages.
- (b) The present invention protects software code from being viewed. In this manner software algorithms may remain secret.
- (c) The present invention protects software from being duplicated. Furthermore, each instance of the software is tied to a single executing software protecting device.
- (d) The present embodiment allows the software programmer to protect the software using the Java programming language which is a high level programming language. Using Java allows a programmer to code without direct link to software protection device. The present embodiment allows the software programmer to use a large memory pool using a virtual memory Java implementation.
- (e) The present invention does not require embedded programming knowledge or any encryption or authentication techniques.
- (f) The present invention presents an autonomous device for protecting data execution independently of computing device and of storage device.
- (g) The present invention provides a method to dynamically receive software and content files and to protect these files from being duplicated and used in an unauthorized manner.
- (h) The present invention allows software owners to let software users fully test their software without risk of software duplication. In addition, software owners may extend trial periods for software and/or charge for longer trial periods. In this manner, both software users and software owners gain. Software users can fully try out the software as well as lease the software for a longer period of time, while software owners get paid for their software usage.
- (i) Software execution does not require a network connection or a connection to an external computing entity to complete execution.
- (j) Execution of software is allowed according to set rules. Device may be given to another person to use software capable of running using that device.
- (k) The present invention provides an infrastructure to transfer, update, store, control usage and execute software in a manner that is protected and isolated from user reach.
- (l) Protected software and data files cannot be altered, leading to a safe and controlled program execution.
- (m) A development kit and the infrastructure for transferring programs serve as tools for the development of a new type of protected applications.

CONCLUSION, RAMIFICATIONS AND SCOPE

Accordingly, the reader will see that the disclosure of this invention provides a method to protect software from being altered, modified, viewed, duplicated or used in an unauthorized manner. The fact that an internal program execution environment and internal program decryptor operate within protecting device makes code files and data files inaccessible externally, providing the ability to protect software and content files.

Furthermore the closure of this invention has the additional advantages in that:

- (a) Following software installation or purchase, the software may be fully used without the requirement of a network connection.
- (b) Software may be freely moved between computers and between people, much like a physical object can be moved between places and people. The software may be used anywhere any time, providing it conforms to the software allowed usage policy.
- (c) The present invention provides an infrastructure to transfer, store, control the usage and execute software in a manner that is protected and isolated from user reach.
- (d) A development kit and the infrastructure serve as a tool for the development of new applications with additional protection mechanism.
- (e) Different software and data files from different vendors may coexist on the same protecting device without the risk of security breach between files of different companies.

Although the description above contains many specifications, these should not be constructed as limiting the scope of the invention but as merely providing illustrations of some exemplary embodiments of this invention.

For example, a Java program may consist of plurality of class files rather than a single class. Some files may be used to read data and some to write data; The interpreter and software code which is a Java virtual machine and java bytecodes in this embodiment may be scripting code or even compiled code or semi-compiled code. This invention may be used by applications for reasons other than software protection. Software protection is just one example. Other examples may be game information that may be securely kept and manipulated, data that represents goods or money that may be manipulated etc; Software protection device may have its own non-volatile storage; Device holding data may be any type of device such as flash cards, hard drives or other devices; Protected software may be updated as well as protected content files, which may include program information aiding algorithms, book files, music files, multimedia files, databases etc. A digital appliance may be a PC as well as other appliances such as a multimedia player, a mobile phone, a mobile device and so on.

While certain features of the invention have been illustrated and described herein, many modifications, substitutions, changes, and equivalents may now occur to those of ordinary skill in the art. It is, therefore, to be understood that the appended claims are intended to cover all such modifications and changes as fall within the true spirit of the invention.

It is expected that during the life of this patent many relevant secured storage media devices and systems will be developed and the scope of the terms herein, particularly of the terms "software protection device" and "internal program execution unit", is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A software protection device for carrying out computations in a protected environment, the device comprising:
    a processing unit;
    means of preventing access to at least part of said processing unit from outside of said processing unit;
    a decryption means for decrypting protected data said decryption means configured to decrypt at least partly encrypted data by said processing unit using said means of preventing access to at least part of said processing unit;
    a virtual machine configured for executing computer program code said virtual machine configured to execute at least partially by said processing unit using said means of preventing access to at least part of said processing unit;
    whereby decryption of at least partly encrypted program and execution of decrypted said at least partly encrypted program by said virtual machine within at least part of said software protection device protects code contents and protects said virtual machine executing said code contents from outside of said software protection device.

2. The software protection device of claim 1, wherein said virtual machine implements a secure virtual memory mechanism using memory external to said processing unit wherein memory used by said virtual machine is at least partly encrypted when located outside of said processing unit.

3. The software protection device of claim 2, further comprising an encryption engine configured for at least partially encrypting memory for said secure virtual memory mechanism said decryption functionality unit configured for decrypting at least partly encrypted memory for said virtual memory mechanism, thereby protecting memory of said virtual machine located outside of said processing unit.

4. The software protection device of claim 1, further comprising a means of entering a secure mode of operation of said software protection device using authenticated data stored in said at least part of non volatile memory that is inaccessible outside of software protection device.

5. The device of claim 1 further comprising external memory located outside of said processing unit and further comprising means of securely making use of at least part of said external memory to execute said virtual machine wherein contents of said at least part of said external memory used by said virtual machine is encrypted for use of said virtual machine.

6. A method for executing a protected program in a protected manner using a software protection device the method comprising:
    a. sending one or more at least part of at least partially encrypted programs to said software protection device;
    b. preventing access to at least part of said software protection device from outside of said software protection device;
    c. decrypting said at least one part of one of said at least partially encrypted programs within said at least part of said software protection device prevented from access outside of said device;
    d. executing said at least one partially decrypted program part by a virtual machine configured to execute computer program code within at least part of said software protection device prevented from access outside of said device.

7. The method according to claim 6 wherein said at least one part of said protected program executed by said virtual machine makes use of at least one at least partially encrypted data content file during execution of said protected program.

8. The method according to claim 6 further comprising sending out at least partially encrypted memory used by said virtual machine for executing said protected program and receiving at least partly encrypted memory for use of said virtual machine for executing said protected program.

9. A method according to claim 6 wherein securing of at least part of external memory located outside of said software protection device for use of executing said virtual machine for protecting execution of said computer program from access outside said processing unit.

10. A secure software protection unit configured for limiting access to restricted data for carrying out computations in a protected environment, the software protection unit comprising:
    a processing unit;
    means of preventing access to at least part of said processing unit from outside of said processing unit;
    a virtual machine configured for executing computer program code using said processing unit said virtual machine configured to execute at least partially on said processing unit using said means of preventing access to at least part of said processing unit
    external memory located outside of said processing unit;
    means of securely making use of at least part of said external memory to execute said virtual machine wherein contents of said at least part of said external memory used by said virtual machine is encrypted for use of said processing unit;
    whereby computer program executed by said virtual machine using said at least part of said processing unit and using said at least part of said external memory to execute said computer program in a protected environment.

11. A method for executing a protected program in a protected manner using a software protection device the method comprising:

a. sending one or more at least part of at least partially authorized programs to said software protection device;
b. preventing access to at least part of said software protection device from outside of said software protection device;
c. authorizing said at least one part of one of said at least partially authorized programs within said at least part of said software protection device prevented from access outside of said device;
d. executing said at least one partially authorized program part by a virtual machine configured to execute computer program code within at least part of said software protection device prevented from access outside of said device.

12. The method according to claim 11 wherein said at least one part of said protected program makes use of at least one at least partially authorized data content file during execution of said protected program by said virtual machine.

13. The method according to claim 11 wherein said at least one part of said protected program makes use of at least one at least partially encrypted data content file during execution of said protected program by said virtual machine.

14. The method according to claim 11 further comprising sending out at least partially encrypted swapped out memory used by said virtual machine for executing said protected program and receiving at least partly encrypted swapped in memory for use of said virtual machine executing said protected program.

15. The method according to claim 11 further comprising sending out at least partially authorized swapped out memory used by said virtual machine for executing said protected program and receiving at least partly authorized swapped in memory for use of said virtual machine for executing said protected program.

16. A method according to claim 11 wherein securing of at least part of external memory located outside of said software protection device for executing said virtual machine in a protected environment.

17. A method for executing a protected program in a protected manner using a software protection device the method comprising:
a. preventing access to at least part of processing unit of said software protection device from outside of said processing unit (for securing execution of said virtual machine);
b. executing said protected computer program using a virtual machine executing on at said at least part of said processing unit at least partially prevented from access outside of said software protection device;
c. securely making use of at least part of external memory located outside of said processing unit by said virtual machine for said executing said protected computer program at least partially prevented from access outside of said software protection device wherein said at least part of external memory used by said virtual machine is encrypted for use of said virtual machine.

* * * * *